United States Patent
Fujiwara et al.

(10) Patent No.: US 9,283,914 B2
(45) Date of Patent: Mar. 15, 2016

(54) VEHICLE SEAT EQUIPPED WITH SIDE AIRBAG APPARATUS AND METHOD OF ASSEMBLING SIDE AIRBAG APPARATUS TO VEHICLE SEAT

(71) Applicant: TOYOTA JIDOSHA KABUSHIKI KAISHA, Toyota-shi, Aichi (JP)

(72) Inventors: Yusuke Fujiwara, Okazaki (JP); Gen Takahashi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/432,880

(22) PCT Filed: Oct. 9, 2013

(86) PCT No.: PCT/JP2013/077535
§ 371 (c)(1),
(2) Date: Apr. 1, 2015

(87) PCT Pub. No.: WO2014/057996
PCT Pub. Date: Apr. 17, 2014

(65) Prior Publication Data
US 2015/0251623 A1    Sep. 10, 2015

(30) Foreign Application Priority Data
Oct. 10, 2012    (JP) .................... 2012-225527

(51) Int. Cl.
*B60R 21/207* (2006.01)
*B60R 21/215* (2011.01)
(Continued)

(52) U.S. Cl.
CPC .............. *B60R 21/207* (2013.01); *B60N 2/427* (2013.01); *B60N 2/58* (2013.01); *B60R 21/215* (2013.01); *B60N 2002/5808* (2013.01); *B60R 2021/21537* (2013.01)

(58) Field of Classification Search
CPC ................ B60R 21/207; B60R 21/215; B60R 2021/21537; B60N 2/427; B60N 2/58; B60N 2002/5808
See application file for complete search history.

(56) References Cited

U.S. PATENT DOCUMENTS 5,762,363 A    6/1998   Brown et al.
5,826,938 A    10/1998  Yanase et al.
(Continued)

FOREIGN PATENT DOCUMENTS

JP    H08-258660 A    10/1996
JP    H09-104316 A    4/1997
(Continued)

*Primary Examiner* — Laura Freedman
(74) *Attorney, Agent, or Firm* — Oliff PLC

(57) ABSTRACT

A vehicle seat equipped with a side airbag apparatus and method thereof that even if a pad side face portion and pad rear face portion of a seatback pad are disposed at a vehicle width direction outer side and vehicle rearward side of a side frame at a side opposing a vehicle body side portion, improve assembly operations. The webbing sewn into a loop shape along a cover cleaving portion, and the airbag module is inserted into the webbing. An opening portion formed between front face and side face portions of a side pad portion of the seatback pad, and the airbag module and webbing are inserted through the opening portion. The side face and rear face portions connecting to one another by a reduced thickness portion. Accordingly, the rear face portion may turn about the reduced thickness portion and a nut may fasten from the vehicle rearward side.

12 Claims, 6 Drawing Sheets

(51) Int. Cl.
*B60N 2/427* (2006.01)
*B60N 2/58* (2006.01)

(56) References Cited

U.S. PATENT DOCUMENTS

| | | | | |
|---|---|---|---|---|
| 5,944,341 | A * | 8/1999 | Kimura | B60R 21/207 |
| | | | | 280/728.3 |
| 6,089,594 | A * | 7/2000 | Hasegawa | B60N 2/42 |
| | | | | 280/728.2 |
| 6,352,304 | B1 * | 3/2002 | Sorgenfrei | B60R 21/207 |
| | | | | 280/730.2 |
| 7,669,889 | B1 * | 3/2010 | Gorman | B60R 21/207 |
| | | | | 280/730.2 |
| 8,328,231 | B2 * | 12/2012 | Nakamura | B60R 21/2176 |
| | | | | 280/728.2 |
| 9,067,558 | B2 * | 6/2015 | Akiyama | B60R 21/207 |
| | | | | 280/728.3 |
| 2006/0113760 | A1 * | 6/2006 | Tracht | B60R 21/207 |
| | | | | 280/730.2 |
| 2006/0131848 | A1 | 6/2006 | Miyake et al. | |
| 2011/0057426 | A1 | 3/2011 | Nakamura et al. | |

FOREIGN PATENT DOCUMENTS

| | | |
|---|---|---|
| JP | H09-226505 A | 9/1997 |
| JP | H10-203294 A | 8/1998 |
| JP | 2000-043669 A | 2/2000 |
| JP | 2002-154361 A | 5/2002 |
| JP | 2002-166765 A | 6/2002 |
| JP | 2006-103645 A | 4/2006 |
| JP | 2006-143213 A | 6/2006 |
| JP | 3804144 B2 | 8/2006 |
| JP | 2011-056975 A | 3/2011 |
| WO | 00/06426 A1 | 2/2000 |

* cited by examiner

VEHICLE SEAT EQUIPPED WITH SIDE AIRBAG APPARATUS AND METHOD OF ASSEMBLING SIDE AIRBAG APPARATUS TO VEHICLE SEAT

TECHNICAL FIELD

The present invention relates to a vehicle seat equipped with a side airbag apparatus and to a method of assembling the side airbag apparatus to the vehicle seat.

BACKGROUND ART

Patent Reference 1 mentioned below discloses a technology relating to a vehicle seat that incorporates a side airbag apparatus. Specifically, an airbag module of the side airbag apparatus is attached, via a bracket, to a side frame that is at a side of a seatback frame that opposes a vehicle body side portion. A webbing (a sheet-shaped member) is provided so as to enclose the airbag module and the side frame. The webbing is divided in two, between an inner side and an outer side. Front end portions of these left and right webbings are respectively sewn to two ends of a cleaving portion (an opening portion) of a cover of the vehicle seat. Rear end portions of the left and right webbings are sewn to one another.

In a case according to the vehicle seat described above, an assembly procedure of the vehicle seat equipped with a side airbag apparatus is as follows. First, the front end portions of the two divided webbings are preparatorily sewn to the two end portions of the cleaving portion of the cover of the vehicle seat. Thereafter, a seatback pad of the vehicle seat is covered with the cover in this state. Then, the airbag module having being preparatorily attached to the side frame at the vehicle width direction outer side of the seatback frame, the seatback pad is assembled to the seatback frame. Finally, the rear end portions of the left and right webbings are joined by sewing at the rear side of the airbag module.

RELATED ART REFERENCES

Patent References

Patent Reference 1: Japanese Patent No. 3,804,144

SUMMARY OF INVENTION

Technical Problem

However, a seatback pad may be employed in which a pad side face portion and a pad rear face portion are disposed at the vehicle width direction outer side and the vehicle rearward side of a side frame of a seatback frame that opposes a vehicle body side portion. If this seatback pad is employed in a case according to the conventional technology described above, the pad side face portion and the pad rear face portion impede assembly operations. That is, there is a problem in that joining operations of the webbings and assembly operations of the airbag module are very difficult to perform.

In consideration of the circumstances described above, an object of the present invention is to provide a vehicle seat equipped with a side airbag apparatus and a method of assembling the side airbag apparatus to the vehicle seat that may, even if a pad side face portion and a pad rear face portion of a seatback pad are disposed at a vehicle width direction outer side and a vehicle rearward side of a side frame at a side that opposes a vehicle body side portion, improve assembly operations of a webbing and an airbag module.

Solution to Problem

A vehicle seat equipped with a side airbag apparatus according to a first aspect includes: an airbag module of the side airbag apparatus that is disposed at a vehicle width direction outer side of a side frame, the side frame being at a side of a seatback frame that opposes a vehicle body side portion; a webbing, two end portions of which are sewn along a cleaving portion provided at a cover of a seatback, the webbing being formed into a loop shape and the airbag module being disposed in the loop; a fixing portion for directly or indirectly fastening and fixing the airbag module to the side frame from a rear face side of the seatback; a seatback pad that is covered by the cover and that includes a pad front face portion disposed at a vehicle forward side of the side frame, a pad side face portion disposed at the vehicle width direction outer side of the side frame, and a pad rear face portion disposed at the vehicle rearward side of the side frame, either an opening portion that enables insertion of the airbag module being formed between the pad front face portion and the pad side face portion or a door portion that corresponds to the opening portion being formed in the pad side face portion; and a hinge portion that is disposed at the vehicle width direction outer side of the fixing portion and enables turning of the pad rear face portion to a vehicle forward-outer side thereof.

In a vehicle seat equipped with a side airbag apparatus of a second aspect, in the first aspect, the hinge portion is a reduced thickness portion that connects the pad side face portion and the pad rear face portion to one another.

In a vehicle seat equipped with a side airbag apparatus of a third aspect, in the first aspect or the second aspect, a bolt insertion hole for a stud bolt to be inserted through is formed in a central portion of the webbing, the stud bolt projecting to the vehicle rearward side from the airbag module.

In a vehicle seat equipped with a side airbag apparatus of a fourth aspect, in any one of the first to third aspects, the airbag module is formed to be narrow and long in a length direction of the seatback, and the opening portion has an up-and-down direction dimension that enables insertion of the airbag module in a state in which the airbag module confronts the seatback.

In a vehicle seat equipped with a side airbag apparatus of a fifth aspect, in any one of the first to fourth aspects, the door portion is structured such that peripheral edge portions thereof excluding the hinge portion are detached from the pad side face portion, and such that an opening portion is formed in the pad side face portion by the door portion being turned to a vehicle rearward-outer side thereof about the hinge portion.

In a vehicle seat equipped with a side airbag apparatus of a sixth aspect, in the first aspect, the pad side face portion and the pad rear face portion are integrally formed and are continuous with one another at the same thickness, a bracket made of metal is provided at the side frame, a mounting seat of the bracket being formed at a rear face of the airbag module, and the hinge portion is a region of the pad side face portion that is adjacent to an outer side distal end portion of the mounting seat of the bracket.

In a vehicle seat equipped with a side airbag apparatus of a seventh aspect, in any one of the first to sixth aspects, the cover includes a side cover that covers a side face of the seatback pad and a rear cover that covers a rear face of the seatback pad, and the side cover and the rear cover are separably joined by a fastener.

In a vehicle seat equipped with a side airbag apparatus of an eighth aspect, in any one of the first to sixth aspects, the cover includes a side cover that covers a side face of the seatback pad, a rear end portion of the side cover is attached to the side frame side, and a face of the seatback at the vehicle rearward side thereof, including the rear end portion of the side cover, is covered by a seatback board.

In a vehicle seat equipped with a side airbag apparatus of a ninth aspect, in any one of the first to fifth aspects, the fixing portion is structured by: a bracket that is formed in an "L" shape in a plan sectional view, the bracket including a longitudinal wall portion that is fixed to a face at the vehicle width direction outer side of the side frame, and a lateral wall portion in which a bolt insertion hole is formed; a stud bolt that is provided standing from a inflator or provided standing from a diffuser that regulates a flow of gas jetted out from the inflator; and a nut to be threaded onto the stud bolt, the stud bolt being inserted through the bolt insertion hole of the bracket, and the nut fastening and fixing the airbag module to the lateral wall portion of the bracket.

In a vehicle seat equipped with a side airbag apparatus of a tenth aspect, in the ninth aspect, an end portion at the vehicle width direction outer side of the lateral wall portion is folded over to the vehicle rearward side thereof by hemming.

A method of assembling a side airbag apparatus to a vehicle seat according to an eleventh aspect includes: a first step of disposing an airbag module of the side airbag apparatus in a loop of a webbing that is sewn into a loop shape along a cleaving portion provided at a cover; a second step of inserting the webbing and the airbag module through an opening portion formed between a pad front face portion and a pad side face portion of a side portion of a seatback pad, and disposing the webbing and the airbag module at a vehicle width direction outer side of a side frame that is at a side of a seatback frame that opposes a vehicle body side portion; a third step of inserting a stud bolt into a bolt insertion hole in a bracket provided at the side frame, the stud bolt projecting to a vehicle rearward side from a rear portion of the airbag module; and a fourth step of turning a pad rear face portion of the side portion of the seatback pad to a vehicle forward-outer side thereof about a hinge portion, the pad rear face portion being disposed at the vehicle rearward side of the side frame, inserting a tool from the vehicle rearward side of the seatback, and fastening a nut to the stud bolt.

A method of assembling a side airbag apparatus to a vehicle seat according to a twelfth aspect includes: a first step of disposing an airbag module of the side airbag apparatus in a loop of a webbing that is sewn into a loop shape along a cleaving portion provided at a cover; a second step of turning a door portion provided at a pad side face portion to a vehicle rearward-outer side thereof about a hinge portion that is formed between the pad side face portion and a pad rear face portion of a side portion of a seatback pad, and disposing the webbing and the airbag module at a vehicle width direction outer side of a side frame that is at a side of a seatback frame that opposes a vehicle body side portion; a third step of inserting a stud bolt into a bolt insertion hole in a bracket provided at the side frame, the stud bolt projecting to the vehicle rearward side from a rear portion of the airbag module; and a fourth step of turning the pad rear face portion to a vehicle forward-outer side thereof about the hinge portion, inserting a tool from the vehicle rearward side of the seatback, and fastening a nut to the stud bolt.

According to the first aspect, because the two end portions of the webbing are sewn along the cleaving portion of the cover and formed into the loop shape, an operation of joining two webbings, which is necessary when a webbing with a structure that is divided in two is employed, is unnecessary.

The airbag module of the side airbag apparatus is inserted to the inner side of the loop of the webbing. In this state, while the seatback pad is covered with the cover, the airbag module is disposed at the vehicle width direction outer side of the side frame. Specifically, in the case in which the opening portion is formed between the pad front face portion and the pad rear face portion, the webbing and the airbag module are inserted into the opening portion from the vehicle forward side of the seatback. Alternatively, in the case in which the door portion is formed in the pad side face portion, the door portion is turned to a vehicle rearward-outer side thereof about the hinge portion to form an opening portion, after which the webbing and the airbag module are inserted into the opening portion from the vehicle width direction outer side of the seatback. Subsequently, the pad rear face portion is turned to the vehicle forward-outer side about the hinge portion. In this state, a tool is inserted from the vehicle rearward side of the seatback, and the airbag module is fastened and fixed to the side frame, directly or indirectly. The tool may be inserted from the vehicle rearward side of the seatback and fasten at the rear face because, after the webbing and the airbag module have been inserted inside the seatback pad from the vehicle forward side or the vehicle width direction outer side in this manner, the pad rear face portion may be turned to the vehicle forward-outer side about the hinge portion. Therefore, even though the pad side face portion and the pad rear face portion are present, the airbag module may be assembled to the side frame with ease.

According to the second aspect, because the pad side face portion and the pad rear face portion are connected to one another by the reduced thickness portion, the pad rear face portion may be smoothly turned to the vehicle forward-outer side about the reduced thickness portion that is the hinge portion.

According to the third aspect, when the airbag module has been inserted into the loop of the webbing, the stud bolt projecting to the vehicle rearward side from the airbag module may be inserted into the bolt insertion hole formed in the webbing and provisionally assembled thereto. Moreover, the webbing is not mispositioned relative to the airbag module when the airbag module is fixed to the side frame by the fixing portion.

According to the fourth aspect, the airbag module is formed to be narrow and long in the length direction of the seatback, and the opening portion has an up-and-down direction dimension that allows insertion of the airbag module in the state in which the airbag module confronts the seatback. Therefore, there is no need to incline the airbag module when inserting the airbag module into the opening portion. Thus, it is not difficult to insert the airbag module into the opening portion without the airbag module being greatly angled relative to the webbing.

According to the fifth aspect, peripheral edge portions of the door portion provided in the pad side face portion are detached from the pad side face portion except at the hinge portion, and an opening portion is formed in the pad side face portion by the door portion being turned to the vehicle rearward-outer side about the hinge portion. Hence, the webbing and the airbag module may be inserted through the opening portion formed in the pad side face portion.

According to the sixth aspect, the pad side face portion and pad rear face portion are integrally formed and are continuous at the same thickness. The bracket made of metal is provided at the side frame, and the mounting seat of the bracket is disposed at the rear face of the airbag module. Consequently, the adjacent region of the pad side face portion that is adjacent to the outer side distal end portion of the mounting seat of the bracket is higher in stiffness than regions to the front and rear thereof. Therefore, even when a distinct hinge portion such as a reduced thickness portion or the like is not provided, this adjacent region may function as the hinge portion and the pad rear face portion may be turned to the vehicle forward-outer side.

According to the seventh aspect, because the side cover and rear cover of the cover are separably joined by the fastener, the rear cover may be preparatorily separated from the side cover when the airbag module is to be assembled.

According to the eighth aspect, the airbag module is assembled to the side frame, after which the rear end portion of the side cover is attached to the side frame. Thereafter, the vehicle rearward side of the seatback, including the rear end portion of the side cover, is covered by the seatback board.

According to the eleventh aspect, first, in the first step, the airbag module of the side airbag apparatus is disposed in the loop of the webbing that has been sewn into the loop shape along the cleaving portion provided at the cover. Then, in the second step, the webbing and the airbag module are inserted through the opening portion formed between the pad side face portion and the pad rear face portion of the side portion of the seatback pad, and the webbing and the airbag module are disposed at the vehicle width direction outer side of the side frame that is at the side of the seatback frame that opposes the vehicle body side portion. Then, in the third step, the stud bolt projecting to the vehicle rearward side from the rear portion of the airbag module is inserted into the bolt insertion hole in the bracket provided at the side frame. Thereafter, in the fourth step, the pad rear face portion that is disposed at the vehicle rearward side of the side frame at the side portion of the seatback pad is turned to the vehicle forward-outer side about the hinge portion. In this state, a tool is inserted from the vehicle rearward side of the seatback and a nut is fastened to the stud bolt. After this fastening of the airbag module, the pad rear face portion is restored to its original state. Thus, the side airbag apparatus is fastened and fixed to the side frame of the seatback frame from the vehicle rearward side of the seatback. In the present invention, this is a method of assembly that is useful when a height of the side airbag is not particularly high and an opening portion may be formed for the insertion of the airbag module between the pad front face portion and the pad side face portion.

According to the twelfth aspect, first, in the first step, the airbag module of the side airbag apparatus is disposed in the loop of the webbing that has been sewn into the loop shape along the cleaving portion provided at the cover. Then, in the second step, the door portion provided in the pad side face portion is turned to the vehicle rearward-outer side about the hinge portion that is formed between the pad side face portion and the pad front face portion of the side portion of the seatback pad. Thus, an opening portion is formed in the pad side face portion. In this state, the webbing and the airbag module are disposed at the vehicle width direction outer side of the side frame at the side of the seatback frame that opposes the vehicle body side portion. Then, in the third step, the stud bolt projecting to the vehicle rearward side from the rear portion of the airbag module is inserted into the bolt insertion hole in the bracket provided at the side frame. Thereafter, in the fourth step, the pad rear face portion is turned to the vehicle forward-outer side about the hinge portion. In this state, a tool is inserted from the vehicle rearward side of the seatback and a nut is fastened to the stud bolt. After this fastening of the airbag module, the pad rear face portion is restored to its original state. Thus, the side airbag apparatus is fastened and fixed to the side frame of the seatback frame from the vehicle rearward side of the seatback. In the present invention, this is a method of assembly that is useful when the height of the side airbag is high, and accordingly an opening portion therefor may not be formed between the pad front face portion and the pad side face portion.

Advantageous Effects of Invention

As described hereabove, the vehicle seat equipped with a side airbag apparatus according to the first aspect has an excellent effect in that, even though the pad side face portion and the pad rear face portion of the seatback pad are disposed at the vehicle width direction outer side and the vehicle rearward side of the side frame at the side that opposes the vehicle body side portion, assembly operations of the webbing and the airbag module may be improved.

The vehicle seat equipped with a side airbag apparatus according to the second aspect has an excellent effect in that the operation of fastening the airbag module may be carried out smoothly.

The vehicle seat equipped with a side airbag apparatus according to the third aspect has an excellent effect in that assembly operations of the airbag module in relation to the webbing may be improved, The vehicle seat equipped with a side airbag apparatus according to the fourth aspect has an excellent effect in that the operation of assembly to the seatback pad of the cover to which the airbag module has been provisionally assembled may be improved.

The vehicle seat equipped with a side airbag apparatus according to the fifth aspect has an excellent effect in that, even in a case in which a height of the side airbag in an inflated and expanded state is large and it is difficult for an opening portion with a corresponding up-and-down direction dimension to be formed between the pad front face portion and the pad side face portion, ease of the assembly operation of the airbag module to the side frame may be assured.

The vehicle seat equipped with a side airbag apparatus according to the sixth aspect has an excellent effect in that the airbag module fastening operation may be performed even if a distinct hinge portion such as a reduced thickness portion or the like is not formed.

The vehicle seat equipped with a side airbag apparatus according to the seventh aspect has an excellent effect in that the operation of assembly of the airbag module to the side frame may be further improved.

The vehicle seat equipped with a side airbag apparatus according to the eighth aspect has an excellent effect in that, because the rear end portion of the side cover is covered by the seatback board, designability of the vehicle seat may be improved.

The methods of assembling a side airbag apparatus to a vehicle seat according to the eleventh and twelfth aspects have an excellent effect in that, even though the pad side face portion and the pad rear face portion of the seatback pad are disposed at the vehicle width direction outer side and the vehicle rearward side of the side frame at the side that opposes the vehicle body side portion, assembly operations of the webbing and the airbag module may be improved.

DESCRIPTION OF EMBODIMENTS

—First Exemplary Embodiment—

Figure 1:
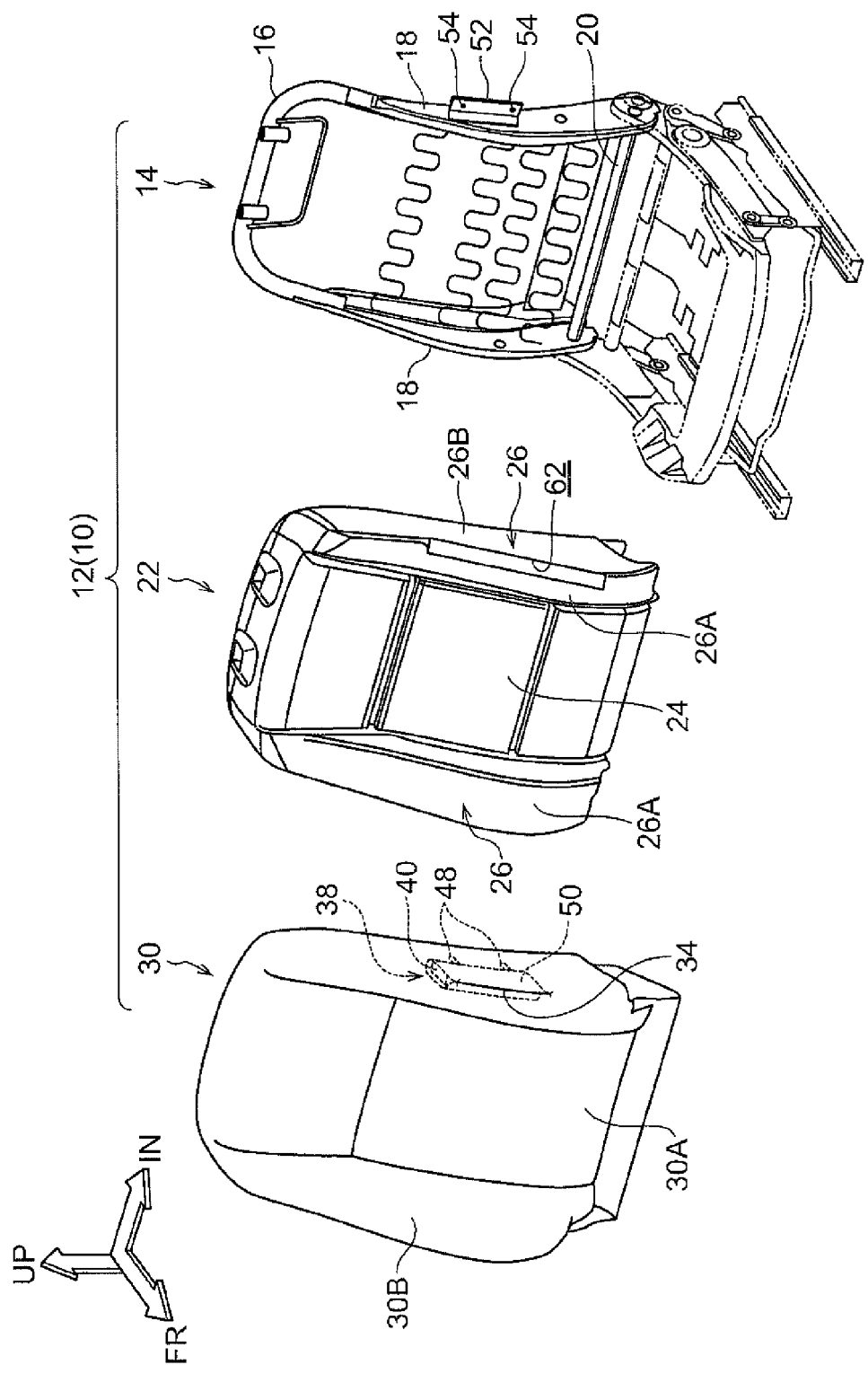
FIG. 1 is an exploded perspective diagram of a vehicle seat equipped with a side airbag apparatus in accordance with a first exemplary embodiment.

Herebelow, a first exemplary embodiment of the vehicle seat equipped with a side airbag apparatus and the method of assembling the side airbag apparatus to the vehicle seat according to the present invention is described using FIG. 1 to FIG. 4. Herein, the arrow FR that is shown where appropriate in the drawings indicates a vehicle forward side, the arrow UP indicates a vehicle upper side, and the arrow IN indicates a vehicle width direction inner side.

Figure 4:
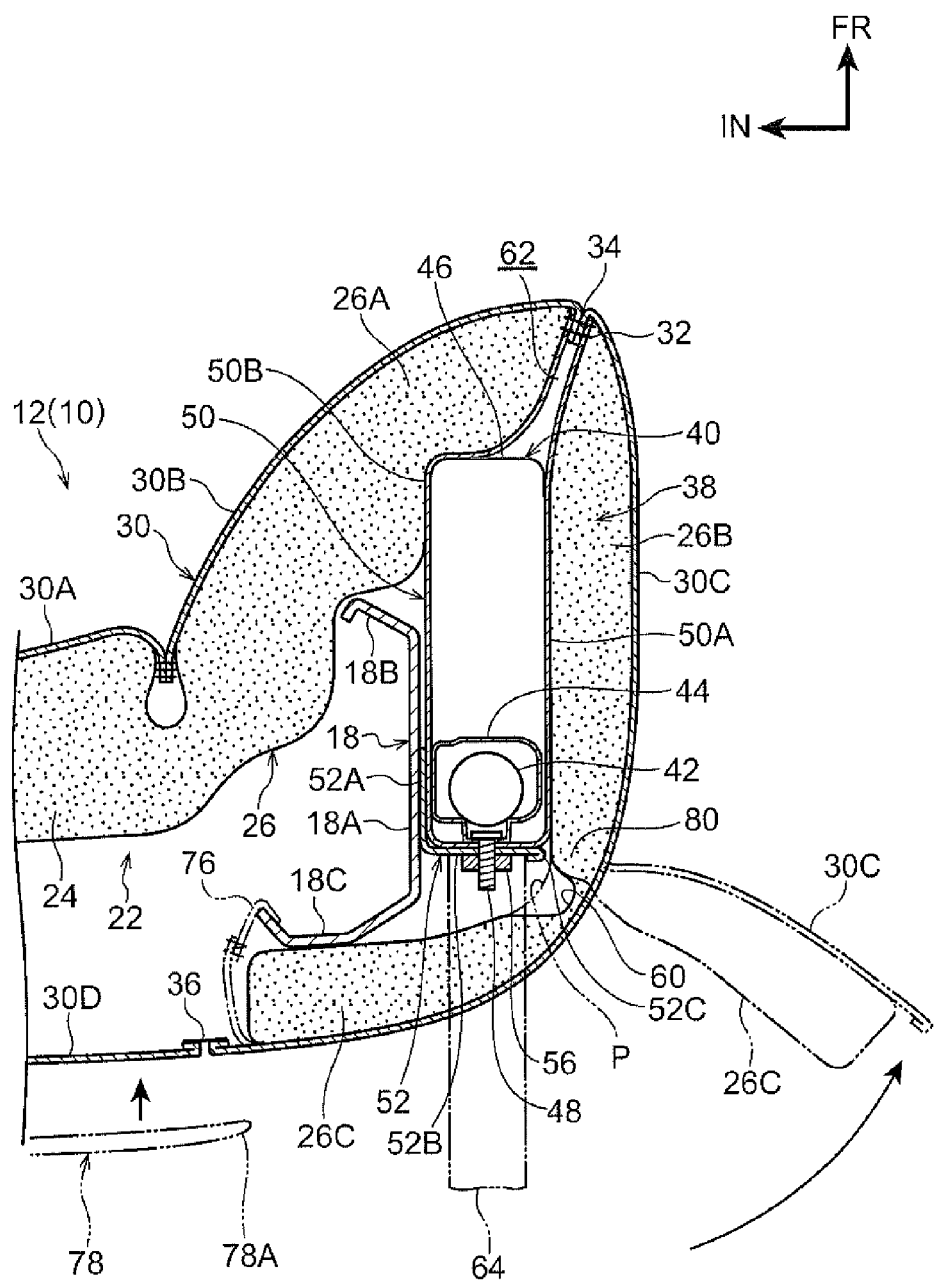
FIG. 4 is a lateral sectional diagram of the seatback pad that shows a third step and a fourth step of the procedure for assembly of the side airbag apparatus to the vehicle seat, showing a state in which a stud bolt is inserted into a bracket and a nut is fastened at a rear face.

As shown in FIG. 1 and FIG. 4, a vehicle seat 10 is provided with a seat cushion, a seatback 12 and a headrest. An occupant sits on the seat cushion, which is not shown in the drawings. The seatback 12 tiltably stands from a rear end portion of the seat cushion and supports the upper body of the occupant. The headrest, which is not shown in the drawings, is provided at an upper end portion of the seatback 12 and supports the head of the occupant.

The seatback 12 is provided with a seatback frame 14, made of metal, that structures a skeleton frame. The seatback frame 14 includes a pipe-shaped upper frame 16 and a pair of left and right side frames 18. The upper frame 16 is formed in an inverted "U" shape in a front view. The side frames 18 are welded to two left and right end portions of the upper frame 16. Lower end portions of the left and right side frames 18 are joined to one another in the vehicle width direction by a connecting rod 20, which is structured by a pipe member.

Each side frame 18 is formed by press-molding such that a shape thereof in a plan sectional view is a substantial "C" shape. To be specific, the side frame 18 is structured by a longitudinal wall portion 18A, a front wall portion 18B and a rear wall portion 18C. The longitudinal wall portion 18A extends along the vehicle front-and-rear direction in the plan sectional view. The front wall portion 18B is inflected at an obtuse angle to the vehicle width direction inner side from the front end of the longitudinal wall portion 18A. The rear wall portion 18C is inflected at an obtuse angle to the vehicle width direction inner side from the rear end of the longitudinal wall portion 18A, and then an end portion of the rear wall portion 18C extending in the vehicle width direction is inflected again to the vehicle forward side. The side frame 18 is described again in relation to a side airbag apparatus 38, which is described below.

A seatback pad 22 that is formed of a cushion material such as urethane foam or the like is disposed at the vehicle forward side of the above-described seatback frame 14. The seatback pad 22 is provided with, broadly divided, a front main pad portion 24 and a pair of left and right side pad portions 26. The front main pad portion 24 is disposed at the front face side of the seatback 12 and supports the upper body of the seated occupant. The side pad portions 26 are disposed at the two vehicle width direction sides of the front main pad portion 24 and support the upper body of the seated occupant from both sides thereof. The side pad portions 26 are formed integrally with the front main pad portion 24. Each side pad portion 26 is formed in a shape that protrudes to the vehicle forward side relative to a front face of the front main pad portion 24. The side pad portion 26 is provided with a pad front face portion 26A, a pad side face portion 26B and a pad rear face portion 26C. The pad front face portion 26A is disposed at the vehicle forward side of the side frame 18. The pad side face portion 26B is disposed at a vehicle width direction outer side of the side frame 18. The pad rear face portion 26C is disposed at the vehicle rearward side of the side frame 18. An accommodation portion 28 (see FIG. 3) in a substantially cuboid shape is formed in a region enclosed by the pad front face portion 26A, the pad side face portion 26B and the pad rear face portion 26C. The accommodation portion 28 is for accommodating an airbag module 40 of the side airbag apparatus 38 that is described below.

The seatback pad 22 described above is covered by a cover 30. The cover 30 includes a front main cover 30A, a front side cover 30B, a side cover 30C and a rear cover 30D. The front main cover 30A covers the front main pad portion 24 from the vehicle forward side thereof. The front side cover 30B covers the pad front face portion 26A from the vehicle forward side thereof. The side cover 30C covers the pad side face portion 26B and the pad rear face portion 26C from the vehicle width direction outer side and the vehicle rearward side thereof. The rear cover 30D covers the rear face side of the seatback 12 from the vehicle rearward side thereof. An outer side end portion of the front side cover 30B and a front side end portion of the side cover 30C are sewn together over a predetermined range in the vehicle up-and-down direction by a stitching thread 32, which is to be broken by the action of a tension load of at least a predetermined value. This region serves as a cleaving portion 34. A rear end portion of the side cover 30C and an outer side end portion of the rear cover 30D are separably joined together by a fastener 36.

The side airbag apparatus 38 operates when there is a side impact. The airbag module 40 of the side airbag apparatus 38 is disposed at the vehicle width direction outer side of the side frame 18 that is at a vehicle width direction outer side of the seatback frame 14 described above (the side of the seatback frame 14 that opposes a vehicle body side portion). The airbag module 40 is accommodated in the above-mentioned accommodation portion 28 in the side portion of the seatback pad 22. The airbag module 40 is structured with principal portions thereof being an inflator 42, a retainer 44 made of metal, and a side airbag 46. The inflator 42 is formed in a substantially cylindrical shape. The retainer 44 covers around the inflator 42. The side airbag 46 is folded up into a thin, substantially cuboid shape.

To expand on the structure of each of these portions, a squib (an ignition device), which is not shown in the drawings, is disposed at one axial direction end portion of the inflator 42. A gas generating agent that generates large quantities of gas when combusted is charged into the interior of the inflator 42. In addition, a coolant for cooling the high-temperature gas that is generated, a filter for removing debris that is produced when the gas generating agent combusts, and the like are accommodated in the inflator 42. The inflator 42 is an inflator of a type that uses a gas generating agent, but may be an inflator of a type in which high-pressure gas is sealed. A gas jetting-out portion is formed at the other axial direction end portion side of the inflator 42. Numerous gas jetting-out holes are formed in a periphery wall portion of the gas jetting-out portion. The inflator 42 described above is connected to a controller (an airbag ECU), which is not shown in the drawings, disposed at a central portion of the floor of the vehicle body. The controller is connected to a side impact detection sensor, which is not shown in the drawings, that is disposed in a vehicle body side portion such as a rocker, a center pillar or the like, or in a side door or the like.

The retainer 44 is formed in a tubular shape, and the inflator 42 is disposed inside the retainer 44. The retainer 44 is fixed to an outer periphery portion of the inflator 42 by crimping. A pair of upper and lower stud bolts 48 are provided standing from an outer periphery portion of the retainer 44. The retainer 44 functions as a diffuser that regulates the flow of gas jetted out from the gas jetting-out holes of the inflator 42 into predetermined directions (for example, to both sides in the axial direction of the inflator 42). The stud bolts 48 may be provided standing from the inflator 42 rather than from the retainer 44.

The side airbag 46 forms a thin, cuboid shape overall. The side airbag 46 is formed with a size that protects the seated occupant, for example, from the waist to the shoulder (a side airbag that protects from the waist to the shoulder and also as far as the head is discussed below in a second exemplary embodiment). The inflator 42 and the retainer 44 are inserted inside the side airbag 46, and in this state the side airbag 46 is folded up into the thin, cuboid shape. In this state in which the airbag module 40 has been constructed, the pair of upper and lower stud bolts 48 penetrate through the side airbag 46 and are projected to the exterior of the airbag module 40.

Figure 2A:
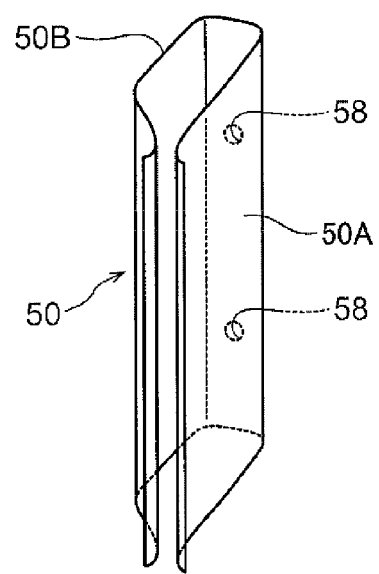
FIG. 2A and FIG. 2B show a first step of a procedure for assembly of the side airbag apparatus to the vehicle seat, FIG. 2A being a perspective diagram showing the webbing and the airbag module in a state before assembly and FIG. 2B being a perspective diagram showing the webbing and the airbag module in a state after assembly.
Figure 2B:
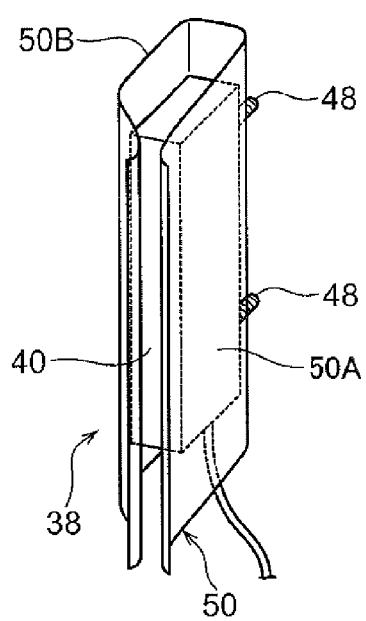

As shown in FIG. 2A and FIG. 2B, the airbag module 40 described above is covered by a webbing 50. A material with the characteristic of being resistant to stretching and compression is used for the webbing 50; for example, the same material as is used for the side airbag 46. In an unfolded state, the webbing 50 is formed in, for example, a substantially rectangular shape. Two end portions of the webbing 50 at the short sides thereof are sewn along the cleaving portion 34 that is formed by the outer side end portion of the front side cover 30B and the front side end portion of the side cover 30C. Thus, the webbing 50 is formed into a loop shape in plan view. The airbag module 40 is inserted inside the loop of the webbing 50 and is disposed in this state.

Figure 3:
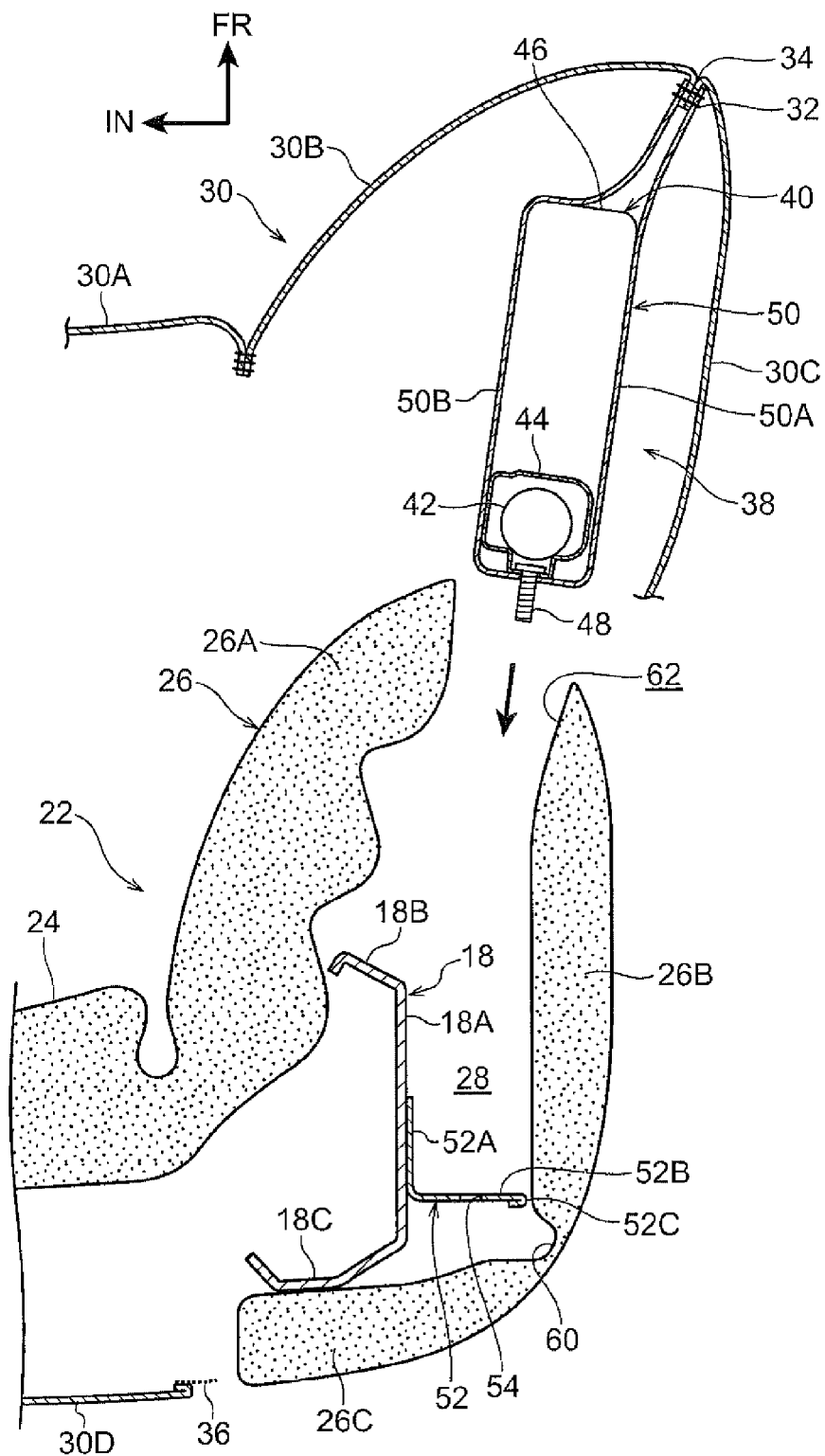
FIG. 3 is a lateral sectional diagram of a seatback pad that shows a second step of the procedure for assembly of the side airbag apparatus to the vehicle seat, showing a state in which the webbing and the airbag module, which are integrated with a cover, are inserted into the seatback pad.

As shown in FIG. 1, FIG. 3 and FIG. 4, a bracket 52 is attached to the longitudinal wall portion 18A of the side frame 18 at the vehicle width direction outer side of the seatback frame 14 described above. The bracket 52 is inflected in an "L" shape in a plan sectional view. The bracket 52 is provided with a longitudinal wall portion 52A and a lateral wall portion 52B. The longitudinal wall portion 52A of the bracket 52 is fixed to the longitudinal wall portion 18A of the side frame 18 by welding or the like. The lateral wall portion 52B is disposed to be perpendicular to the longitudinal wall portion 18A of the side frame 18 at the vehicle width direction outer side of the longitudinal wall portion 18A. A pair of upper and lower bolt insertion holes 54 are formed at a vehicle width direction middle portion of the lateral wall portion 52B. The stud bolts 48 are inserted into the bolt insertion holes 54 from the vehicle forward side to the vehicle rearward side thereof, and the stud bolts 48 are fastened and fixed by nuts 56. The bracket 52, stud bolts 48 and nuts 56 correspond to a "fixing portion" of the present invention. An end portion 52C at the vehicle width direction outer side of the lateral wall portion 52B is folded over to the vehicle rearward side thereof by hemming, thus preventing damage to the side airbag 46.

The webbing 50 described above is arranged so as to cover outer periphery portions of the airbag module 40 described above. Bolt insertion holes 58 are formed in a length direction middle portion of the webbing 50. The bolt insertion holes 58 are for insertion of the stud bolts 48 of the airbag module 40. The webbing 50 is divided into an outer side webbing 50A and an inner side webbing 50B by a boundary that is at the positions at which the bolt insertion holes 58 are formed. The outer side webbing 50A is disposed so as to pass between the side airbag 46 in the folded state and the pad side face portion 26B, and reach the cleaving portion 34. The inner side webbing 50B is disposed so as to pass between the side airbag 46 in the folded state and the longitudinal wall portion 18A of the side frame 18, and between the side airbag 46 and the pad front face portion 26A, and reach the cleaving portion 34.

As shown in FIG. 3 and FIG. 4, the pad side face portion 26B and pad rear face portion 26C of the side portion of the seatback pad 22 are connected to one another by a reduced thickness portion 60 that serves as a hinge portion. The reduced thickness portion 60 is disposed at the vehicle width direction outer side of the fixing portion formed by the stud bolts 48 and the nuts 56. Thus, the pad rear face portion 26C is turnable to a vehicle forward-outer side thereof about the reduced thickness portion 60.

As shown in FIG. 1, an opening portion 62 in a slit shape along the vehicle up-and-down direction is formed at a boundary portion between the pad front face portion 26A and the pad side face portion 26B of the side portion of the seatback pad 22 described above. The opening portion 62 has an up-and-down direction dimension that enables insertion of the airbag module 40 therein in a state in which the airbag module 40 is oriented in line with the seatback 12.

Operation and Effects of the Present Exemplary Embodiment

Now, operation and effects of the present exemplary embodiment are described.

First, a method (procedure) for assembling the side airbag apparatus 38 to the vehicle seat 10 is described. As shown in FIG. 1, the webbing 50 is preparatorily sewn into the loop shape along the cleaving portion 34 at a rear face side of the cover 30.

From this state, as shown in FIG. 2A, in a first step, the airbag module 40 of the side airbag apparatus 38 is inserted inside the loop of the webbing 50. At this time, the stud bolts 48 are inserted into the pair of upper and lower bolt insertion holes 58 formed in the length direction middle portion of the webbing 50 (see FIG. 2B). Then, as shown in FIG. 3, in a second step, the webbing 50 and the airbag module 40 are inserted through the opening portion 62 formed between the pad front face portion 26A and the pad side face portion 26B of the seatback pad 22. In a third step, the pair of upper and lower stud bolts 48 of the airbag module 40 are inserted into the respective bolt insertion holes 54 formed in the lateral wall portion 52B of the bracket 52. Thus, the airbag module 40 and webbing 50 are disposed at the vehicle width direction outer side of the longitudinal wall portion 18A of the side frame 18. At the same time, the webbing 50 is nipped between the airbag module 40 and the lateral wall portion 52B of the bracket 52.

Then, as shown in FIG. 4, in a fourth step, the pad rear face portion 26C of the side portion of the seatback pad 22 that is disposed at the vehicle rearward side of the side frame 18 is turned to the vehicle forward-outer side thereof about the reduced thickness portion 60. In this state, a tool 64 is inserted from the vehicle rearward side of the seatback 12 and fastens the nuts 56 to the stud bolts 48. After this fastening of the airbag module 40, the pad rear face portion 26C is restored to its original state. Thus, the side airbag apparatus 38 is fastened and fixed to the side frame 18 of the seatback frame 14 from the vehicle rearward side of the seatback 12. In the present exemplary embodiment, this is a method of assembly that is useful when the height of the side airbag 46 is not particularly large and the opening portion 62 for insertion of the airbag module 40 may be formed between the pad front face portion 26A and the pad side face portion 26B.

If the vehicle in which the vehicle seat 10 described above is installed undergoes a side impact, the side impact is detected by the side impact detection sensor, which is not shown in the drawings, and sensing signals are outputted to the controller. The controller passes a predetermined electric current through the squib of the inflator 42 of the side airbag apparatus 38. As a result, the gas generating agent combusts and generates a large quantity of gas, and the gas is jetted out into the side airbag 46 through the gas jetting-out holes in the inflator 42. As a result, the side airbag 46 that was stowed in the folded state inflates, the cover 30 of the seatback 12 is cleaved, starting from the cleaving portion 34, and the side airbag 46 inflates and expands to the vehicle forward side. The inflated and expanded side airbag 46 is sandwiched between the upper body of the seated occupant and a door trim, and protects the upper body of the seated occupant from impact by compressively deforming.

In the present exemplary embodiment, because the two end portions of the webbing 50 are sewn along the cleaving portion 34 of the cover 30 to form the loop shape, an operation to join two webbings, which is necessary when a webbing with a structure that is divided in two is employed, is unnecessary. Two brackets for fixing a webbing that is divided in two to the side frame 18 are also unnecessary. Furthermore, because the airbag module 40 may be inserted into the opening portion 62 of the seatback pad 22 from the vehicle forward side and then the pad rear face portion 26C may be turned to the vehicle forward-outer side thereof about the reduced thickness portion 60, the tool 64 may be inserted and perform fastening at the rear face from the vehicle rearward side of the seatback 12. Therefore, even though the pad side face portion 26B and the pad rear face portion 26C are present, the airbag module 40 may be assembled to the side frame 18 with ease.

From the above descriptions, according to the vehicle seat 10 equipped with the side airbag apparatus 38 and the method of assembly of the side airbag apparatus 38 to the vehicle seat 10 relating to the present exemplary embodiment, even though the pad side face portion 26B and the pad rear face portion 26C of the seatback pad 22 are disposed at the vehicle width direction outer side and the vehicle rearward side of the side frame 18 at the side that opposes the vehicle body side portion, assembly operations of the webbing 50 and the airbag module 40 may be improved.

Further, in the present exemplary embodiment, because the pad side face portion 26B and the pad rear face portion 26C are connected to one another by the reduced thickness portion 60, the pad rear face portion 26C may be smoothly turned to the vehicle forward-outer side about the reduced thickness portion 60. Therefore, the fastening operation of the airbag module 40 may be carried out smoothly.

In the present exemplary embodiment, when the airbag module 40 is inserted into the loop of the webbing 50, the stud bolts 48 projecting to the vehicle rearward side from the airbag module 40 may be inserted into the bolt insertion holes 58 formed in the webbing 50 and provisionally assembled. Furthermore, the webbing 50 is not mispositioned relative to the airbag module 40 when the airbag module 40 is fixed to the side frame 18 by the stud bolts 48 and the nuts 56. Therefore, according to the present exemplary embodiment, assembly operations of the airbag module 40 in relation to the webbing 50 may be improved.

In the present exemplary embodiment, the airbag module 40 is formed in a narrow, long shape in the seatback length direction, and the opening portion 62 has an up-and-down direction dimension that allows insertion of the airbag module 40 in the state in which the airbag module 40 is oriented in line with the seatback 12. Therefore, there is no need to incline the airbag module 40 when inserting the airbag module 40 into the opening portion 62. Thus, there is no difficulty in inserting the airbag module 40 into the opening portion 62 without the airbag module 40 being greatly angled relative to the webbing 50. Therefore, the operation of assembly of the cover 30 to which the airbag module 40 has been provisionally assembled to the seatback pad 22 may be improved.

In the present exemplary embodiment, because the side cover 30C and rear cover 30D of the cover 30 are separably joined by the fastener 36, the rear cover 30D may be preparatorily separated from the side cover 30C when the airbag module 40 is to be assembled. As a result, the operation of assembly of the airbag module 40 to the side frame 18 may be further improved.

—Second Exemplary Embodiment—

Figure 5:
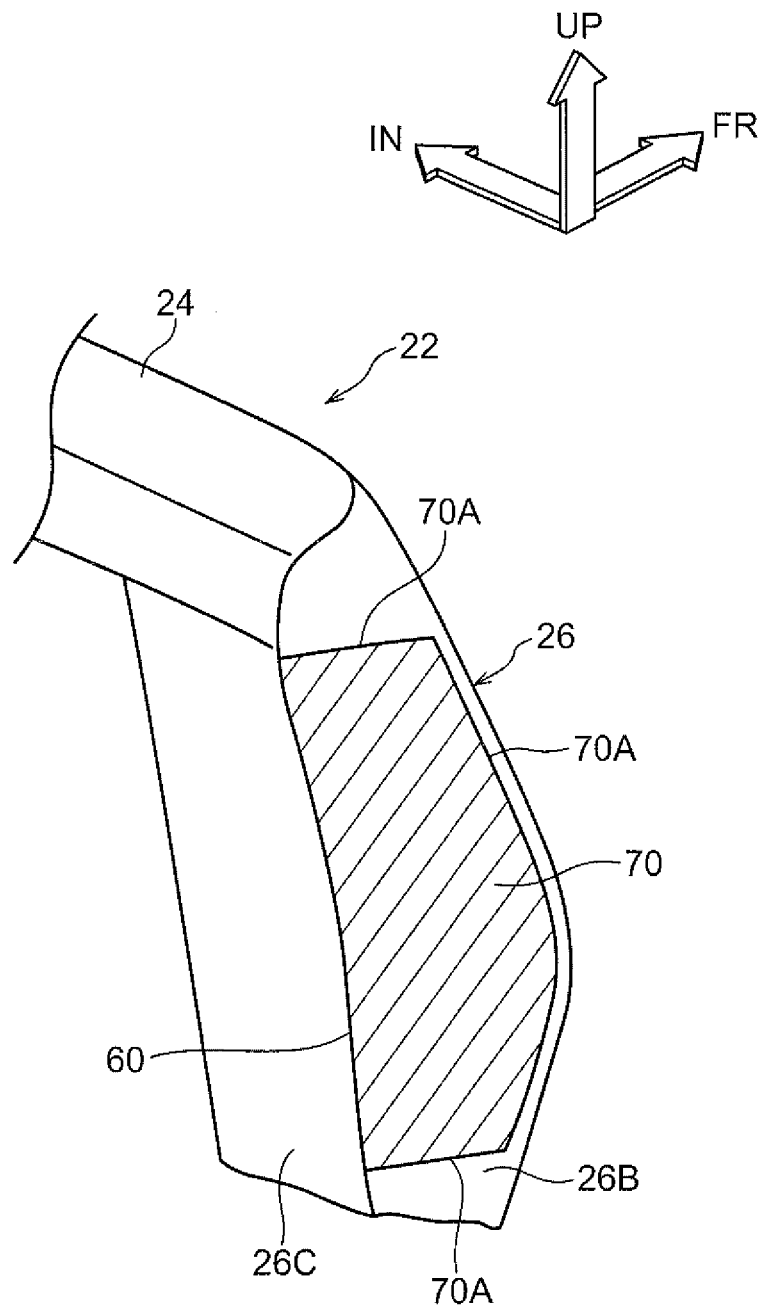
FIG. 5 is a partial perspective diagram of a seatback pad, showing general structure of a side face pad that opens to a vehicle rearward-outer side thereof, at a vehicle seat equipped with a side airbag apparatus in accordance with a second exemplary embodiment.
Figure 6:
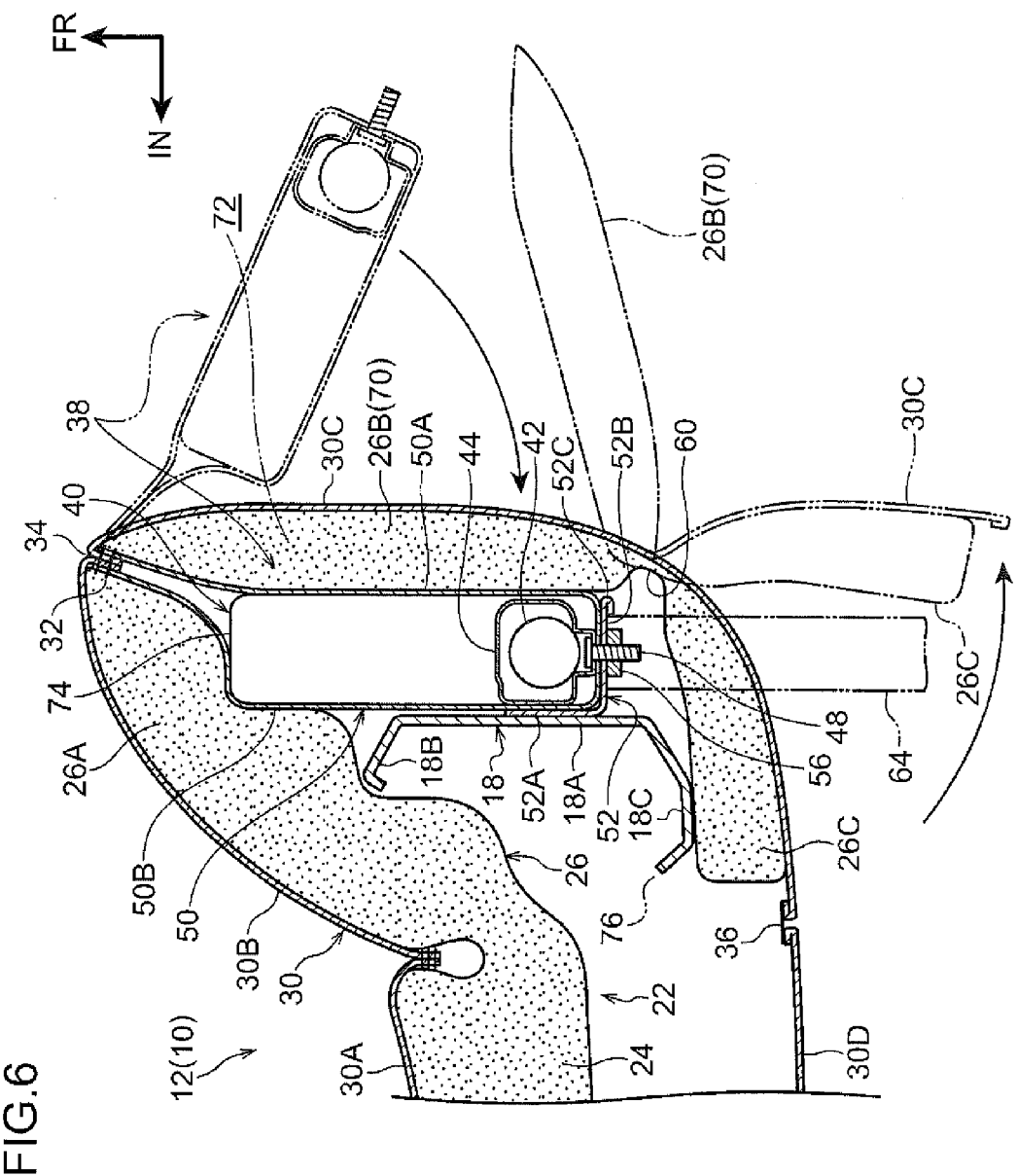
FIG. 6 is a lateral sectional diagram of the seatback pad, corresponding to FIG. 4, illustrating second to fourth steps of a procedure for assembly of the side airbag apparatus to the vehicle seat.

Herebelow, a second exemplary embodiment of the vehicle seat equipped with a side airbag apparatus and the method of assembling the side airbag apparatus to the vehicle seat according to the present invention is described using FIG. 5 and FIG. 6. Structural portions that are the same as in the first exemplary embodiment described above are assigned the same reference numerals, and descriptions thereof are not given.

As shown in FIG. 5 and FIG. 6, the second exemplary embodiment is characterized by, instead of the opening portion 62 being provided between the pad front face portion 26A and the pad side face portion 26B, a door portion 70 being provided at a position of the pad side face portion 26B at which the side airbag apparatus 38 is to be disposed.

The door portion 70 is formed in a substantially rectangular shape in a side view. Peripheral edge portions 70A are formed along three sides of the door portion 70, excluding the aforementioned reduced thickness portion 60. The door portion 70 is detached from the pad side face portion 26B at the peripheral edge portions 70A. Thus, the door portion 70 is structured such that an opening portion 72 (see FIG. 6) is formed in the pad side face portion 26B by the door portion 70 being turned to a vehicle rearward-outer side thereof about the reduced thickness portion 60. An up-and-down direction dimension of the opening portion 72 is specified to be larger than the up-and-down direction dimension of the opening portion 62 according to the first exemplary embodiment. A side airbag 74 of the side airbag apparatus 38 according to the second exemplary embodiment is a large-size side airbag that has a height in the vehicle up-and-down direction higher than that of the side airbag 46 according to the first exemplary embodiment and that includes a protection area from the waist to the shoulder (and also to the head).

—Operation and Effects—

According to the structure described above, the side airbag apparatus 38 is assembled to the vehicle seat 10 by the following procedure.

First, in a first step, the airbag module 40 of the side airbag apparatus 38 is disposed inside the loop of the webbing 50 that has been sewn into the loop shape along the cleaving portion 34 provided at the cover 30. Then, in a second step, the pad side face portion 26B is turned to the vehicle rearward-outer side about the reduced thickness portion 60 formed between the pad side face portion 26B and the pad front face portion 26A of the side portion of the seatback pad 22, as illustrated by the two-dot chain lines in FIG. 6. As a result, the opening portion 72 is formed in the pad side face portion 26B with a size that enables insertion of the airbag module 40 from the vehicle width direction outer side. In this state, the airbag module 40 is turned about the cleaving portion 34 toward the side thereof at which the side frame 18 is disposed. Thus, the webbing 50 and the airbag module 40 are disposed at the vehicle width direction outer side of the side frame 18.

In a third step, the stud bolts 48 projecting to the vehicle rearward side from the rear portion of the airbag module 40 are inserted into the bolt insertion holes 54 formed in the lateral wall portion 52B of the bracket 52 provided at the side frame 18. Then, in a fourth step, the pad rear face portion 26C is turned to the vehicle forward-outer side about the reduced thickness portion 60. In this state, the tool 64 is inserted from the vehicle rearward side of the seatback 12 and fastens the nuts 56 to the stud bolts 48. After this fastening of the airbag module 40, the pad rear face portion 26C is restored to its original state. Thus, the side airbag apparatus 38 is fastened and fixed to the side frame 18 of the seatback frame 14 from the vehicle rearward side of the seatback 12.

Thus, in the present exemplary embodiment too, similarly to the first exemplary embodiment described above, even though the pad side face portion 26B and the pad rear face portion 26C of the seatback pad 22 are disposed at the vehicle width direction outer side and the vehicle rearward side of the side frame 18 at the side that opposes the vehicle body side portion, assembly operations of the webbing 50 and the airbag module 40 may be improved. In particular in the present exemplary embodiment, this is a method of assembly that is useful when the height of the side airbag 74 is high, and accordingly an opening portion therefor may not be formed between the pad front face portion 26A and the pad side face portion 26B.

In the present exemplary embodiment, at the pad side face portion 26B, the peripheral edge portions 70A are detached from the seatback pad 22 except at the reduced thickness portion 60, and the opening portion 72 is formed in the pad side face portion 26B by the door portion 70 being turned to the vehicle rearward-outer side about the reduced thickness portion 60. Hence, the airbag module 40 may be inserted through the opening portion 72 formed in the pad side face portion 26B. Thus, according to the present exemplary embodiment, even when the height of the side airbag 74 in the inflated and expanded state is to be high and it is difficult for an opening portion with a corresponding up-and-down direction dimension to be formed between the pad front face portion 26A and the pad side face portion 26B, ease of the assembly operation of the airbag module 40 to the side frame 18 may be assured.

—Supplementary Descriptions of the Exemplary Embodiments—

In the exemplary embodiments described hereabove, a structure is employed in which the rear end portion of the side cover 30C and the outer side end portion of the rear cover 30D are joined by the fastener 36, but this is not limiting. For example, a structure illustrated by two-dot chain lines in FIG. 4 may be employed. In this structure, a J-hook 76 is attached to the rear end portion of the side cover 30C by sewing or the like, and the J-hook 76 is anchored at an inner end portion of the rear wall portion 18C of the side frame 18. In addition, the rear cover 30D is removed and a seatback board 78 made of resin is provided instead. The region of the anchoring by the J-hook 76 at the rear end portion of the side cover 30C is prevented from being visible by a vehicle width direction outer side end portion 78A of the seatback board 78. According to this structure, because the rear end portion of the side cover 30C is covered by the seatback board 78, designability of the vehicle seat 10 may be improved.

In the exemplary embodiments described above, the pad side face portion 26B and pad rear face portion 26C are connected to one another via the reduced thickness portion 60, but this is not limiting. As illustrated by the two-dot chain line P in FIG. 4, the pad side face portion 26B and pad rear face portion 26C may be made continuous at the same thickness. In this case too, the bracket 52 that is made of metal in the "L" shape is attached to the vehicle width direction outer side face of the side frame 18, and the airbag module 40 is fastened and fixed to the lateral wall portion 52B (a mounting seat). Thus, an adjacent region 80 of the pad side face portion 26B, which is adjacent to the outer side distal end portion 52C of the lateral wall portion 52B of the bracket 52, is higher in stiffness than regions to the front and rear thereof. That is, if the pad side face portion 26B and pad rear face portion 26C are considered as a single pad outer periphery portion, the effective stiffness thereof changes at the adjacent region 80 at the outer side distal end portion 52C. Therefore, even though a distinct hinge portion such as the reduced thickness portion 60 or the like is not provided, the pad rear face portion 26C may be turned to the vehicle forward-outer side thereof with the adjacent region 80 functioning as a hinge portion. Therefore, with this structure too, the fastening operation of the airbag module 40 may be performed even when a distinct hinge portion such as the reduced thickness portion 60 or the like is not formed. Note that the recitation "the same thickness" in claim 6 does not require the thickness to be strictly the same but means that there is no region such as the reduced thickness portion 60 in which the thickness is distinctively different.

In the exemplary embodiments described hereabove, a structure is employed in which the bracket 52 that is formed in the "L" shape in plan sectional view is attached in advance to the longitudinal wall portion 18A of the side frame 18, but this is not limiting. A bracket that is formed in a "U" shape in plan view may be used. Further, in the structure that is employed, the bracket 52 is attached to the longitudinal wall portion 18A of the side frame 18 and the airbag module 40 is fixed to the side frame 18 indirectly, but this is not limiting. The airbag module may be fixed to the side frame directly. For example, if the front-and-rear width of the side frame is large, a portion of the longitudinal wall portion of the side frame may be cut and raised and a mounting seat for the airbag module set thereat.

The invention claimed is:

1. A vehicle seat equipped with a side airbag apparatus, comprising:

an airbag module of the side airbag apparatus that is disposed at a vehicle width direction outer side of a side frame, the side frame being at a side of a seatback frame that opposes a vehicle body side portion;

a webbing, two end portions of which are sewn along a cleaving portion provided at a cover of a seatback, the webbing being formed into a loop shape and the airbag module being disposed in the loop;

a fixing portion for directly or indirectly fastening and fixing the airbag module to the side frame from a rear face side of the seatback;

a seatback pad that is covered by the cover and that includes a pad front face portion disposed at a vehicle forward side of the side frame, a pad side face portion disposed at the vehicle width direction outer side of the side frame, and a pad rear face portion disposed at a vehicle rearward side of the side frame, either an opening portion that enables insertion of the airbag module being formed between the pad front face portion and the pad side face portion or a door portion that corresponds to the opening portion being formed in the pad side face portion; and a hinge portion that is disposed at the vehicle width direction outer side of the fixing portion and enables turning of the pad rear face portion to a vehicle forward-outer side thereof.

2. The vehicle seat equipped with a side airbag apparatus according to claim 1, wherein the hinge portion is a reduced thickness portion that connects the pad side face portion and the pad rear face portion to one another.

3. The vehicle seat equipped with a side airbag apparatus according to claim 1, wherein a bolt insertion hole for a stud bolt to be inserted through is formed in a central portion of the webbing, the stud bolt projecting to the vehicle rearward side from the airbag module.

4. The vehicle seat equipped with a side airbag apparatus according to claim 1, wherein the airbag module is formed to be narrow and long in a length direction of the seatback, and the opening portion has an up-and-down direction dimension that enables insertion of the airbag module in a state in which the airbag module confronts the seatback.

5. The vehicle seat equipped with a side airbag apparatus according to claim 1, wherein the door portion is structured such that peripheral edge portions thereof excluding the hinge portion are detached from the pad side face portion, and such that an opening portion is formed in the pad side face portion by the door portion being turned to a vehicle rearward-outer side thereof about the hinge portion.

6. The vehicle seat equipped with a side airbag apparatus according to claim 1, wherein
the pad side face portion and the pad rear face portion are integrally formed and are continuous with one another at the same thickness,
a bracket made of metal is provided at the side frame, a mounting seat of the bracket being formed at a rear face of the airbag module, and
the hinge portion is a region of the pad side face portion that is adjacent to an outer side distal end portion of the mounting seat of the bracket.

7. The vehicle seat equipped with a side airbag apparatus according to claim 1, wherein
the cover includes a side cover that covers a side face of the seatback pad and a rear cover that covers a rear face of the seatback pad, and
the side cover and the rear cover are separably joined by a fastener.

8. The vehicle seat equipped with a side airbag apparatus according to claim 1, wherein
the cover includes a side cover that covers a side face of the seatback pad,
a rear end portion of the side cover is attached to the side frame side, and
a face of the seatback at the vehicle rearward side thereof, including the rear end portion of the side cover, is covered by a seatback board.

9. The vehicle seat equipped with a side airbag apparatus according to claim 1, wherein the fixing portion is structured by:
a bracket that is formed in an "L" shape in a plan sectional view, the bracket including a longitudinal wall portion that is fixed to a face at the vehicle width direction outer side of the side frame, and a lateral wall portion in which a bolt insertion hole is formed;
a stud bolt that is provided standing from an inflator or provided standing from a diffuser that regulates a flow of gas jetted out from the inflator; and
a nut to be threaded onto the stud bolt, the stud bolt being inserted through the bolt insertion hole of the bracket, and the nut fastening and fixing the airbag module to the lateral wall portion of the bracket.

10. The vehicle seat equipped with a side airbag apparatus according to claim 9, wherein an end portion at the vehicle width direction outer side of the lateral wall portion is folded over to the vehicle rearward side thereof by hemming.

11. A method of assembling a side airbag apparatus to a vehicle seat, comprising:
a first step of disposing an airbag module of the side airbag apparatus in a loop of a webbing that is sewn into a loop shape along a cleaving portion provided at a cover;
a second step of inserting the webbing and the airbag module through an opening portion formed between a pad front face portion and a pad side face portion of a side portion of a seatback pad, and disposing the webbing and the airbag module at a vehicle width direction outer side of a side frame that is at a side of a seatback frame that opposes a vehicle body side portion;
a third step of inserting a stud bolt into a bolt insertion hole in a bracket provided at the side frame, the stud bolt projecting to a vehicle rearward side from a rear portion of the airbag module; and
a fourth step of turning a pad rear face portion of the side portion of the seatback pad to a vehicle forward-outer side thereof about a hinge portion, the pad rear face portion being disposed at the vehicle rearward side of the side frame, inserting a tool from the vehicle rearward side of the seatback, and fastening a nut to the stud bolt.

12. A method of assembling a side airbag apparatus to a vehicle seat, comprising:
a first step of disposing an airbag module of the side airbag apparatus in a loop of a webbing that is sewn into a loop shape along a cleaving portion provided at a cover;
a second step of turning a door portion provided at a pad side face portion to a vehicle rearward-outer side thereof about a hinge portion that is formed between the pad side face portion and a pad rear face portion of a side portion of a seatback pad, and disposing the webbing and the airbag module at a vehicle width direction outer side of a side frame that is at a side of a seatback frame that opposes a vehicle body side portion;
a third step of inserting a stud bolt into a bolt insertion hole in a bracket provided at the side frame, the stud bolt projecting to the vehicle rearward side from a rear portion of the airbag module; and
a fourth step of turning the pad rear face portion to a vehicle forward-outer side thereof about the hinge portion, inserting a tool from the vehicle rearward side of the seatback, and fastening a nut to the stud bolt.

* * * * *